US010733034B2

(12) United States Patent
Johannsen et al.

(10) Patent No.: US 10,733,034 B2
(45) Date of Patent: Aug. 4, 2020

(54) TRACE MESSAGING FOR DISTRIBUTED EXECUTION OF DATA PROCESSING PIPELINES

(71) Applicant: SAP SE, Walldorf (DE)

(72) Inventors: Daniel Johannsen, Walldorf (DE); Simon Seif, Heidelberg (DE); Boris Gruschko, Heidelberg (DE); Joachim Fitzer, Schriesheim (DE); Christian Krause, Walldorf (DE); Hendrik Radke, Berlin (DE); Anton Niadzelka, Berlin (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/010,018

(22) Filed: Jun. 15, 2018

(65) Prior Publication Data

US 2019/0384659 A1    Dec. 19, 2019

(51) Int. Cl.
*G06F 3/00* (2006.01)
*G06F 9/54* (2006.01)
*G06F 3/0482* (2013.01)
*G06F 9/48* (2006.01)

(52) U.S. Cl.
CPC ............ *G06F 9/546* (2013.01); *G06F 3/0482* (2013.01); *G06F 9/4881* (2013.01); *G06F 9/542* (2013.01)

(58) Field of Classification Search
CPC ...................................................... G06F 9/546
USPC ....................................................... 719/313
See application file for complete search history.

(56) References Cited

U.S. PATENT DOCUMENTS

| 5,761,652 A | 6/1998 | Wu |
| 5,790,119 A | 8/1998 | Sklut et al. |
| 5,918,225 A | 6/1999 | White |
| 6,225,998 B1 | 5/2001 | Okita et al. |
| 6,380,951 B1 | 4/2002 | Petchenkine et al. |

(Continued)

FOREIGN PATENT DOCUMENTS

| CN | 105334841 A | 2/2016 |
| EP | 2930629 A1 | 10/2015 |

OTHER PUBLICATIONS

Mark Klein, A BASis (or ABASs) for Reasoning About Software Architectures. (Year: 2000).*

(Continued)

*Primary Examiner* — Lechi Truong
(74) *Attorney, Agent, or Firm* — Mintz Levin Cohn Ferris Glovsky and Popeo, P.C.

(57) ABSTRACT

A method for routing trace messages during an execution of a data processing pipeline is provided. The method may include receiving, at a master node, a request from a client to receive trace messages output by a worker node executing at least a portion of the data processing pipeline. The master node and the worker node may be part of a distributed cluster of computing nodes. The trace messages may correspond to events occurring during the execution of at least the portion of the data processing pipeline. The master node may respond to the request by subscribing to a trace stream published by the worker node. The trace stream may include the trace messages output by the worker node. The master node may generate a user interface for displaying, at the client, the trace messages. Related systems and articles of manufacture, including computer program products, are also provided.

16 Claims, 7 Drawing Sheets

(56) References Cited

U.S. PATENT DOCUMENTS

| | | |
|---|---|---|
| 7,337,174 B1 | 2/2008 | Craig |
| 7,711,527 B2 | 5/2010 | Sabadell |
| 7,797,342 B2 | 9/2010 | Banks |
| 7,805,456 B2 | 9/2010 | Meijer |
| 7,844,910 B2 | 11/2010 | Shiraishi et al. |
| 8,046,382 B2 | 10/2011 | Valentin |
| 8,056,012 B2 | 11/2011 | Chen et al. |
| 8,117,061 B2 | 2/2012 | May |
| 8,151,208 B2 * | 4/2012 | Sogge .................. G06Q 10/06 715/772 |
| 8,280,903 B2 | 10/2012 | Broder |
| 8,291,408 B1 | 10/2012 | Czymontek |
| 8,301,626 B2 | 10/2012 | Blount |
| 8,341,591 B1 | 12/2012 | Knauth |
| 8,401,819 B2 | 3/2013 | Kavaklioglu |
| 8,682,701 B1 | 3/2014 | Knauth |
| 8,977,600 B2 | 3/2015 | Crupi |
| 9,165,021 B2 | 10/2015 | Bhattacharjee |
| 9,311,615 B2 | 4/2016 | Davenport |
| 9,317,343 B1 * | 4/2016 | Willhoit ............. G06F 16/2228 |
| 9,335,976 B1 | 5/2016 | Verwaest |
| 9,342,273 B1 | 5/2016 | Kumar |
| 9,344,492 B1 | 5/2016 | Dantkale |
| 9,495,207 B1 | 11/2016 | Pjesivac-Grbovic |
| 9,823,950 B1 | 11/2017 | Carrier |
| 10,152,511 B2 | 12/2018 | Rajan et al. |
| 1,020,042 A1 | 2/2019 | Rosenzweig |
| 10,200,428 B1 * | 2/2019 | Rosenzweig ....... H04L 65/4084 |
| 1,037,242 A1 | 8/2019 | Wang |
| 2001/0034881 A1 | 10/2001 | Washington |
| 2001/0037322 A1 | 11/2001 | Lindsay |
| 2002/0035559 A1 | 3/2002 | Crowe |
| 2004/0078364 A1 | 4/2004 | Ripley |
| 2004/0181422 A1 | 9/2004 | Brand |
| 2004/0230553 A1 | 11/2004 | Makowski |
| 2004/0230559 A1 | 11/2004 | Newman |
| 2005/0080755 A1 | 4/2005 | Aoyama |
| 2005/0138000 A1 | 6/2005 | Roux |
| 2006/0095894 A1 | 5/2006 | Wilde |
| 2007/0061777 A1 | 3/2007 | Vashi et al. |
| 2007/0168947 A1 | 7/2007 | Halbedel |
| 2007/0239797 A1 | 10/2007 | Cattell |
| 2007/0250470 A1 | 10/2007 | Duffy |
| 2008/0046562 A1 | 2/2008 | Butler |
| 2008/0098053 A1 | 4/2008 | Miao |
| 2008/0167842 A1 | 7/2008 | Cochran |
| 2008/0281786 A1 | 11/2008 | Duffy |
| 2008/0294374 A1 | 11/2008 | Guralnik |
| 2009/0228434 A1 | 9/2009 | Krishnamurthy |
| 2010/0114973 A1 | 5/2010 | Goyal |
| 2010/0131550 A1 | 5/2010 | Nakadai |
| 2010/0262633 A1 | 10/2010 | Bhattacharjee |
| 2011/0066668 A1 | 3/2011 | Guarraci |
| 2011/0119680 A1 * | 5/2011 | Li ........................ G06F 9/5038 718/106 |
| 2011/0276789 A1 | 11/2011 | Chambers |
| 2011/0276962 A1 | 11/2011 | Chambers |
| 2012/0079449 A1 | 3/2012 | Sanderson |
| 2012/0084315 A1 | 4/2012 | Schneider |
| 2013/0073573 A1 | 3/2013 | Huang |
| 2013/0332873 A1 | 12/2013 | Shapiro |
| 2014/0032527 A1 | 1/2014 | Chambers |
| 2014/0081950 A1 | 3/2014 | Rajan |
| 2014/0089294 A1 | 3/2014 | Shankar |
| 2014/0101150 A1 | 4/2014 | Wang |
| 2014/0108861 A1 | 4/2014 | Abadi |
| 2014/0172914 A1 | 6/2014 | Elnikety |
| 2014/0351233 A1 | 11/2014 | Crupi |
| 2015/0178114 A1 | 6/2015 | Chambers |
| 2015/0277900 A1 | 10/2015 | O'keeffe |
| 2015/0347096 A1 | 12/2015 | Hanna |
| 2015/0372877 A1 | 12/2015 | Tompkins |
| 2016/0055348 A1 | 2/2016 | Lewak |
| 2016/0092808 A1 | 3/2016 | Cheng |
| 2016/0103659 A1 | 4/2016 | Tijanic |
| 2016/0133066 A1 | 5/2016 | Lavie |
| 2016/0299998 A1 | 10/2016 | Isshiki |
| 2016/0321606 A1 | 11/2016 | Kapil |
| 2017/0017797 A1 | 1/2017 | Chambers |
| 2017/0083822 A1 | 3/2017 | Adendorff |
| 2017/0092021 A1 | 3/2017 | Nielsen |
| 2017/0102978 A1 | 4/2017 | Pallath |
| 2017/0169217 A1 | 6/2017 | Rahaman |
| 2017/0242715 A1 | 8/2017 | Chambers |
| 2017/0262516 A1 | 9/2017 | Horowitz |
| 2017/0308547 A1 | 10/2017 | Gupta |
| 2018/0025160 A1 | 1/2018 | Hwang |
| 2018/0046926 A1 | 2/2018 | Achin |
| 2018/0150514 A1 | 5/2018 | Willems |
| 2018/0150515 A1 | 5/2018 | Merker |
| 2018/0329967 A1 | 11/2018 | Lee |
| 2019/0073373 A1 * | 3/2019 | Surale ................. H04L 63/0428 |
| 2019/0108048 A1 | 4/2019 | Chen |

OTHER PUBLICATIONS

AVS Applications Guide, (c) 1992, 83 pages.
AVS Users Guide, Release 4, (c) 1992, 368 pages.
Gorton, et al., Components in the Pipeline, IEEE Software, 2011, pp. 33-40.
Upson, et al., The application visualization system: a computational environment for scientific visualization, IEEE Computer Graphics & Applications, Jul. 1989, pp. 30-42.
Wikipedia entry, Visual programming language, downloaded from https://en.wikipedia.org/wiki/Visual_programming_language, retrieved on Apr. 17, 2019, 8 pages.
Neumann, Efficiently compiling efficient query plans for modern hardware, Proceedings of the VLDB endowment, 2011, pp. 539-550.

\* cited by examiner

TRACE MESSAGING FOR DISTRIBUTED EXECUTION OF DATA PROCESSING PIPELINES

TECHNICAL FIELD

The subject matter described herein relates generally to distributed data processing and more specifically to routing trace messages during execution of a data processing pipeline in a distributed computing system.

BACKGROUND

Data processing may refer to the collection and/or manipulation of data including, for example, validation, sorting, summarization, aggregation, analysis, reporting, classification, and/or the like. But traditional data processing applications may be inadequate for handling exceptionally voluminous and/or complex data sets known as "big data." Instead, big data may require big data processing applications having advanced capabilities specifically tailored for the ingestion, cleansing, storage, analysis, sharing, transformation, and/or visualization of exceptionally voluminous and/or complex data sets.

SUMMARY

Systems, methods, and articles of manufacture, including computer program products, are provided for routing trace messages during an execution of a data processing pipeline in a distributed computing system. In one aspect, there is provided a system including at least one data processor and at least one memory. The at least one memory may store instructions that cause operations when executed by the at least one data processor. The operations may include: receiving, at a first master node, a request from a client to receive one or more trace messages output by a first worker node executing at least a portion of a data processing pipeline, the data processing pipeline including a sequence of data processing operations, the first master node and the first worker node comprising a distributed cluster of computing nodes, and the one or more trace messages corresponding to events occurring during the execution of at least the portion of the data processing pipeline; responding to the request by at least subscribing to a first trace stream published by the first worker node, the first trace stream including the one or more trace messages output by the first worker node; and generating a user interface for displaying, at the client, the one or more trace messages included in the first trace stream published by the first worker node.

In some variations, one or more features disclosed herein including the following features can optionally be included in any feasible combination. The first worker node may execute a first portion of the data processing pipeline and a second worker node may execute a second portion of the data processing pipeline. The first master node may coordinate the execution of the data processing pipeline by the first worker node and the second worker node. The first master node may subscribe to the trace stream published by the first worker node but not a second trace stream published by the second worker node. The subscription may be based at least on the client requesting to receive trace messages output by first worker node but not trace messages output by the second worker node.

In some variations, another request to receive one or more trace messages output by the second worker node during the execution of the second portion of the data processing pipeline may be received from the client. The response to the other request may include subscribing to a second trace stream published by the second worker node. The second trace stream may include the one or more trace messages output by the second worker node. The one or more trace messages included in the first trace stream published by the first worker node and/or the one or more trace messages included in the second trace stream published by the second worker node may be stored in a trace log.

In some variations, the first portion of the data processing pipeline and the second portion of the data processing pipeline may each include one or more data processing operations from the sequence of data processing operations. The one or more data processing operations may be performed on data stored in a database.

In some variations, a listener may be deployed at the first worker node in response to the first master node subscribing to the first trace stream published by the first worker node. The listener may be configured to detect when the first worker node outputs a trace message. At least some trace messages output by the first worker node may be pushed to the first master node. Trace messages output by the first worker node may be filtered prior to being pushed to the first master node. The trace messages may be filtered based at least on a threshold severity level specified by the client.

In some variations, a second master node may subscribe to the first trace stream published by the first worker node in response to a failure at the first master node.

In some variations, the data processing pipeline may be associated with a graph representative of the data processing pipeline. The graph may include a plurality of nodes corresponding to the sequence of data processing operations. The graph may further include one or more edges indicating a flow of data between consecutive data processing operations. At least the portion of the data processing pipeline may be executed based at least on the graph.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to web application user interfaces, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

A data processing pipeline may include a series of data processing operations for collecting and/or manipulating data including, for example, exceptionally voluminous and/or complex data sets known as "big data." The data processing pipeline may be associated with a graph providing a graphical representation of the data processing pipeline. For instance, the graph may include a plurality of nodes, each of which representing a data processing operation in the series of data processing operations. Furthermore, the plurality of nodes may be interconnected by one or more directed edges to indicate a flow of data between consecutive data processing operations. In some example embodiments, the data processing pipeline may be executed, based at least on the graph, by a distributed computing system that includes multiple computing nodes. For example, the graph corresponding to the data processing pipeline may include multiple subgraphs, each of which including some but not all of the operator nodes included in the graph. The data processing operations corresponding to each subgraph may be executed at one or more computing nodes serving as worker nodes while a computing node serving as the master node may coordinate the execution of one or more data processing pipelines by the worker nodes. For instance, one or more master nodes may form a pipeline engine configured to coordinate the execution of one or more data processing pipelines.

In some example embodiments, during the execution of a data processing pipeline by a distributed computing system, one or more worker nodes may each publish a trace stream that includes one or more trace messages. The progress and/or performance of executing the data processing pipeline may be monitored via the trace messages, which may provide information regarding events that occur during the execution of various data processing operations in the data processing pipeline. According to some example embodiments, trace messages output by one or more worker nodes may be pushed to a master node on an on-demand basis. For example, trace messages output by a worker node may be pushed to the master node when the master node becomes a subscriber to the trace stream published by that worker node. But the master node may not become a subscriber to the trace stream published by a worker node executing at least a portion of a data processing pipeline unless a client requests to receive trace messages output by that specific worker node. Network traffic may be minimized by at least avoiding the unnecessary transfer of trace messages output by other worker nodes executing the data processing pipeline.

Figure 1A:
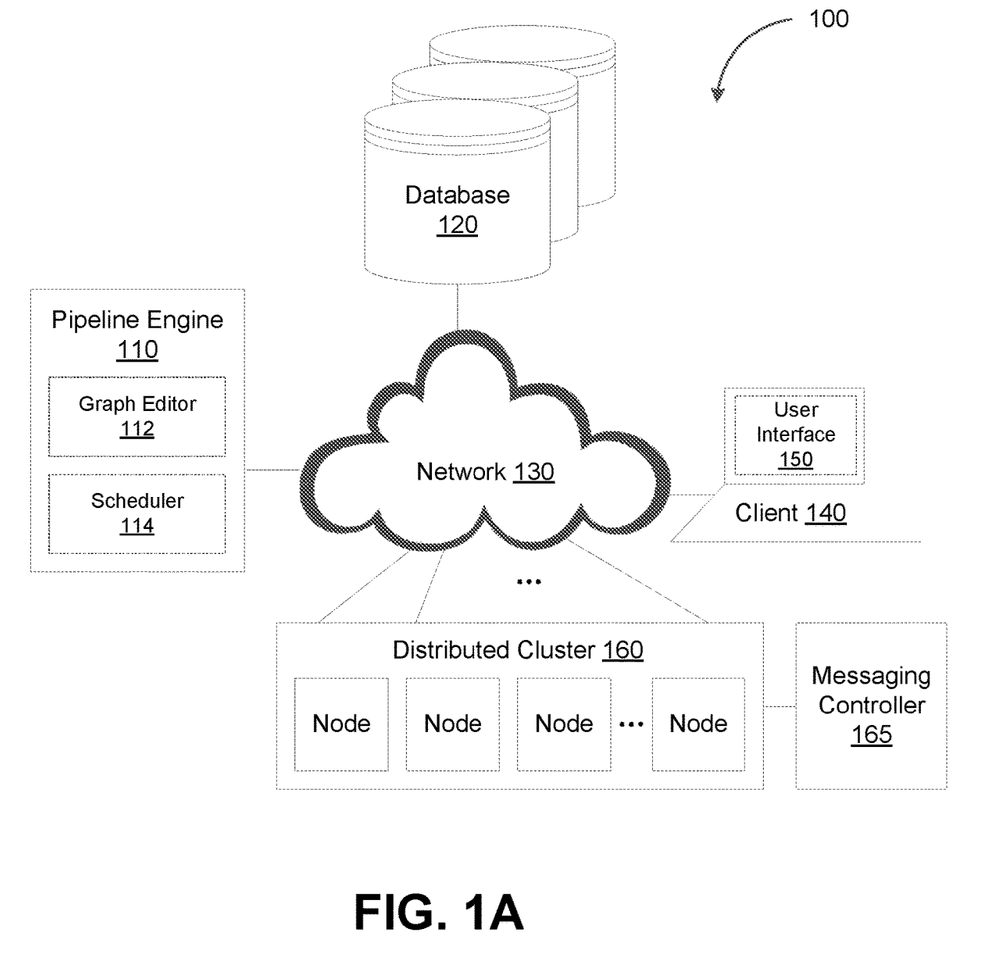
FIG. 1A depicts a system diagram illustrating a data processing pipeline generator system, in accordance with some example embodiments.

FIG. 1A depicts a system diagram illustrating a data processing pipeline generator system 100, in accordance with some example embodiments. Referring to FIG. 1A, the data processing pipeline generator system 100 may include a pipeline engine 110. As shown in FIG. 1A, the pipeline engine 110 may be communicatively coupled, via a network 130, with a database 120, a client 140, and/or a distributed cluster 160. The network 130 may be any wired and/or wireless network including, for example, a public land mobile network (PLMN), a wide area network (WAN), a local area network (LAN), a virtual local area network (VLAN), the Internet, and/or the like.

In some example embodiments, the client 140 may interact with the pipeline engine 110 to generate one or more data processing pipelines. For example, the pipeline engine 110 may be configured to support the construction of graphs that are representative of the data processing pipelines. For example, the data processing pipeline engine may provide a plurality of default operator nodes, each of which having one or more predefined configuration parameters. At least some of the plurality of operator nodes may be customized, for example, by modifying predefined configuration parameters and/or adding additional configuration parameters. A graph representative of a data processing pipeline may be constructed by at least interconnecting, with one or more directed edges, a plurality of default operator nodes and/or customized operator nodes. The graph may form the basis for generating the corresponding data processing pipeline. Executing the data processing pipeline may include applying, to data stored in a database, a series of data processing operations corresponding to the operator nodes included in the graph representative of the data processing pipeline.

As shown in FIG. 1A, the pipeline engine 110 may be associated with a user interface 150 configured to receive, at the client 140, one or more inputs for editing a graph representative of a data processing pipeline. Alternatively and/or additionally, the user interface 150 may also be configured to display, at the client 140, the graph representative of the data processing pipeline during, for example, the editing process.

Figure 2:
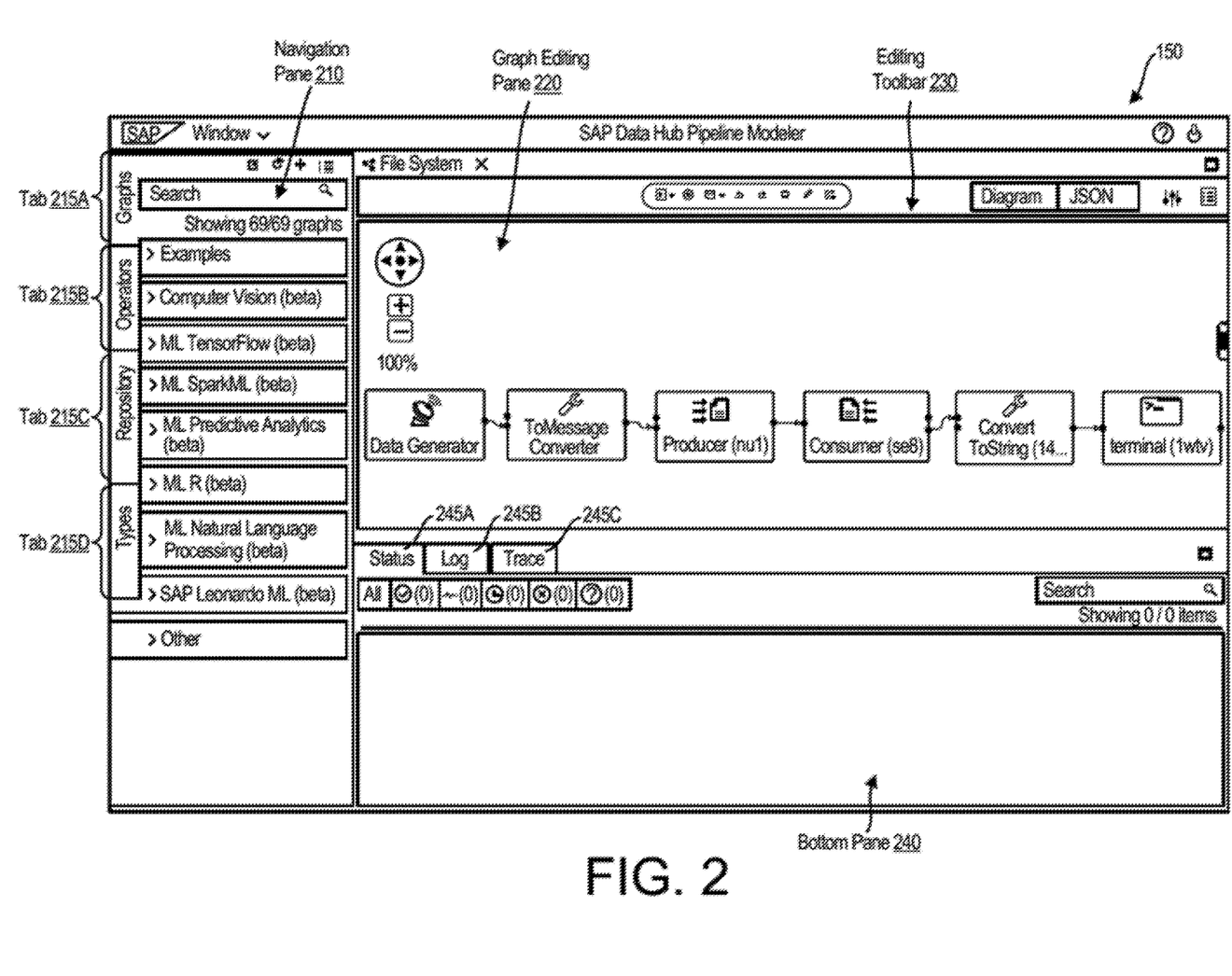
FIG. 2 depicts a user interface, in accordance with some example embodiments.

To further illustrate, FIG. 2 depicts the user interface 150. As shown in FIG. 2, the user interface 150 may include a navigation pane 210, a graph editing pane 220, an editing toolbar 230, and a bottom pane 240. In some example embodiments, the client 140 may access, via the navigation pane 210, one or more operator nodes, graphs, repositories, and/or types. For example, the navigation pane 210 may include a first tab 215A, a second tab 215B, a third tab 215C, and a fourth tab 215D. The client 140 may access, under the first tab 215A, a plurality of graphs representative of data processing pipelines. It should be appreciated that these graphs may include template graphs provided by the pipeline engine 110 and/or custom graphs created by the client 140. Meanwhile, the client 140 may access, under the second tab 215B, a plurality of default operator nodes provided by the pipeline engine 110 and/or customized operator nodes generated by the client 140.

Under the third tab 215C, the client 140 may access one or more repositories storing the dockerfiles that are available to the client 140 from the pipeline engine 110. As used herein, a dockerfile may be any file configured to provide the runtime environment required for executing a data processing pipeline including, for example, the data processing operations corresponding to the default operator nodes and/or customized operator nodes included in the data processing pipeline. For example, a dockerfile may include a script. The script may include a sequence of instructions, which may be executed to generate a docker image. Meanwhile, the docker image may be a stand-alone, executable package that includes all of the components necessary for executing one or more of the data processing operations included in the data processing pipeline including, for example, programming code, runtime, libraries, environment variables, configuration files, and/or the like. Accordingly, executing one or more data processing operations included in the data processing pipeline may include generating a docker image by at least executing a corresponding dockerfile. Furthermore, executing the one or more data processing operations may include executing the docker image in order to provide the necessary runtime environment.

Alternatively and/or additionally, the client 140 may access, under the fourth tab 215D, one or more types. As used herein, a type may refer to a data type including, for example, a string, an object, an array, a number, a Boolean, an integer, and/or the like. Each type may be associated with a definition (e.g., a JavaScript Object Notation (JSON) file) that includes the properties associated with the type. To further illustrate, Table 1 below depicts examples of data types and the corresponding properties. It should be appreciated that the input and/or output of an operator node may be associated with a type, which may determine the type of data that is ingested into and/or output by the operation corresponding to the operator node.

TABLE 1

| VALUE | DESCRIPTION |
| --- | --- |
| String | For properties of data type string, you can define helpers. These helpers enable users to easily identify and define the property values. In the Validation dropdown list, select a value. The tool provides format, predefined values, and services as helpers.<br>Format: You can choose from any of the supported formats such as date and time, URL, Password, or e-mail.<br>Predefined Values: You can preconfigure the property with list of values for users to choose. The property will be displayed to users as a dropdown list of values. In the Value field, provide the list of values.<br>Service: You can specify a URL to obtain the property values from the REST API. The tool displays the response from the service call as auto suggestions for the users. In the Url text field, specify the service URL. |
| Object | For properties of data type object, you can specify the schema of the object by drilling down into the object definition. In the Schema Properties section, double-click the property to drill-down further and to modify the object definition. |
| Custom | Custom data types enable you to set the data type of a property to another user defined type. In the Type dropdown list, select a value. The tool populates the dropdown list with the global schema types. |
| Array | For properties of data type array, you can specify the data types of items in the array. In the Item Type dropdown list, select a value. The tool supports string, Number, and object as data types for array items. |
| Number | For properties of data type number, users can provide numbered values to the property. |
| Boolean | For properties of data type Boolean, users can provide Boolean values to the property. |
| Integer | For properties data type integer, users can provide integer values to the property. |

Referring again to FIG. 2, the client 140 may use the graph editing pane 220 to create a graph representative of a data processing pipeline. For example, as shown in FIG. 2, the client 140 may construct a graph by at least adding and/or removing operator nodes from the graph editing pane 220. The client 140 may select, for instance, a default operator node and/or a customized operator node from under the second tab 215B of the navigation pane 210. In some example embodiments, commands for editing the graph displayed in the graph editing pane 220 may be selected via the editing toolbar 230. For example, the client 140 may customize an operator node added to and displayed in the graph editing pane 220 by selecting, from the editing toolbar 230, a command to customize the configurations of the operator node.

Alternatively and/or additionally, the client 140 may interconnect the operator nodes added to and displayed in the graph editing pane 220 by adding one or more directed edges. For example, the client 140 may interconnect a first operator node and a second operator node displayed in the graph editing pane 220 by selecting an output port on the first operator node and dragging a cursor from the selected output port to an input port on the second operator node.

In some example embodiments, the bottom pane 240 may include a status tab 245A, a log tab 245B, and a trace tab 245C. The client 140 may access, via the status tab 245A, the log tab 245B, and/or the trace tab 245C, a corresponding pane that displays a status of executing a data processing pipeline, which may correspond, for example, to a graph constructed and/or displayed in the graph editing pane 220. For example, trace messages output during the execution of the data processing pipeline may be displayed, at the client 140, under the trace tab 245C of the user interface 150.

Figure 3A:
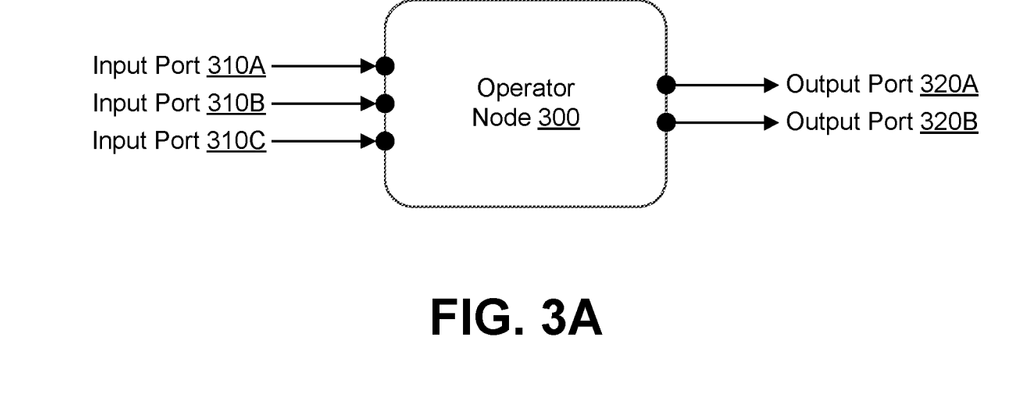
FIG. 3A depicts an example of an operator node, in accordance with some example embodiments.

Referring again to FIG. 1A, the pipeline engine 110 may include a graph editor 112 and a scheduler 114. In some example embodiments, the graph editor 112 may support the construction of graphs that are representative of one or more data processing pipelines. For example, the client 140 may select, for example, via the user interface 150, one or more default operator nodes to add to a graph that is representative of a data processing pipeline. At least some of the selection of default operator nodes provided by the graph editor 112 may be customized by the client 140. For instance, the client 140 may customize a default operator node by modifying a predefined configuration parameter of the default operator node, for example, by changing a value associated with the predefined configuration parameter to a value specified by the client 140. Alternatively and/or additionally, the default operator node may be customized by adding additional configuration parameters to the default operator node. To further illustrate, Table 2 below depicts examples of configuration parameters and values associated with various operator nodes in a data processing pipeline for performing text analysis.

including, for example, a first output port 320A and/or a second output port 320B. In some example embodiments, the operator node 300 may be interconnected, via the input ports and/or the output ports, with one or more other operator nodes to form the graph representative of the data processing pipeline. For example, the client 140 may connect the operator node 300 to another operator node by selecting the first output port 320A and/or the second output port 320B, and dragging a cursor from the first output port 320A and/or the second output port 320B to one or more input ports of the other operator node. The client 140 may also connect the operator node 300 to another operator node by selecting one or more output ports on the other operator node and dragging a cursor from these output ports to the first input port 310A, the second input port 310B, and/or the

TABLE 2

| OPERATOR | CONFIGURATION PARAMETER | VALUE |
| --- | --- | --- |
| HDF S Consumer (Operator id: hdfsconsumer2) | path | Path to the folder on HDFS to be tokenized |
| | hadoopUser | Username to logon to the HDFS server |
| | hadoopNameNode | Host name and port number of the HDFS server |
| | pollPeriodInMs | Interval between two content change detection events, must be >=1000 |
| | onlyReadOnChange | true |
| | Recursive | True |
| HDFS Producer (Operator id: old-hdfsproducerI) | hadoopUser | Username to logon to the HDFS server (must be the same as in hdfsconsumer2) |
| | hadoopNameNode | Host name and port number of the HDFS server (must be the same as in hdfsconsumer2) |
| HDFS Producer (Operator id: old-hdfsproducer2) | hadoopUser | Username to logon to the HDFS server (must be the same as in hdfsconsumer2) |
| | hadoopNameNode | Host name and port number of the HDFS server (must be the same as in hdfsconsumer2) |
| Webservices (Operator id: javascriptoperatorI) | service | One of the following service types: EntityExtraction4 LanguageIdentificationdir LinguisticAnalysis# EnterpriseFactExtraction4 PublicSectorFactExtraction4 SentimentAnalysis# |
| OpenAPI Client (Operator id: open-apickentI) | apiKeyValue | The API key |
| JavaScript Operator2 (Operator id: javascriptoperator21) | WriteLogFile | If true, a log file with possible messages from the API server is written in the HDFS server |

To further illustrate, FIG. 3A depicts an operator node 300, in accordance with some example embodiments. Referring to FIGS. 1-2 and 3A, the operator node 300 may be a default operator node provided by the pipeline engine 110 and associated with one or more predefined configuration parameters. Alternatively and/or additionally, the operator node 300 may be a customized operator node created by the client 140. In some example embodiments, the operator node 300 may be accessed, for example, by the client 140, under the second tab 215B. For example, the client 140 may select the operator node 300 in order to add the operator node 300 to a graph representative of a data processing pipeline. The client 140 may further select the operator node 300 in order to customize the operator node 300 including by, for example, modifying one or more existing configuration parameters of the operator node 300 and/or adding additional configuration parameters to the operator node 300.

Referring again to FIG. 3A, the operator node 300 may include one or more input ports including, for example, a first input port 310A, a second input port 310B, and/or a third input port 310C. Alternatively and/or additionally, the operator node 300 may include one or more output ports third input port 310C of the operator node 300. In doing so, the client 140 may connect the operator node 300 to one or more operator nodes with directed edges indicating the flow of data to and/or from the operator node 300.

In some example embodiments, an output port may be connected to an input port if the output port and the input port are associated with compatible types. The pipeline engine 110 may provide visual indications that enables a visual differentiation between compatible ports and incompatible ports. For example, compatible ports may be displayed, for example, in the user interface 150, using the same color and/or icons. As noted, a type may refer to a data type including, for example, a string, an object, an array, a number, a Boolean, an integer, and/or the like. Accordingly, the first input port 310A, the second input port 310B, and/or the third input port 310C of the operator node 300 may interconnected to the output ports of the other operator node if the ports are associated with compatible types. Similarly, the first output port 320A and/or the second output port 320B may be interconnected to the input ports of the other operator node if the ports are associated with compatible types.

Table 3 below depicts examples of compatible port types. For instance, an input port having the type "string.com" may be compatible with an output port having the type "string-.com.sap." As such, an input port having the type "string-.com" may be interconnected with an output port having the type "string.com.sap." In some example embodiments, the pipeline engine 110 may display the input port having the type "string.com" and the output port having the type "string.com.sap," for example, in the user interface 150, using the same color and/or icon in order to indicate the compatibility between these two ports. Furthermore, the interconnection between the input port and the output port may, for example, by a directed edge. The directed edge may originate from the output port and terminate at the input port, thereby indicating a flow of data from the output port into the input port.

TABLE 3

| INPUT PORT TYPES | OUTPUT PORT TYPES |
|---|---|
| any | any |
| any | any.* |
| any | string |
| any.* | string.* |
| any.* | string.com.sap |
| any.* | string.com.sap.* |
| Any.com.sap | any.com.sap |
| String.com.* | string.com.sap.* |

Table 4 below depicts examples of incompatible port types. For example, an input port having the type "float64." may be incompatible with an output port having the type "int64." As such, an input port having the type "float64." may be not interconnected with an output port having the type "int64." In some example embodiments, the pipeline engine 110 may display the input port having the type "float64." and the output port having the type "int64," for example, in the user interface 150, using different colors and/or icons in order to indicate the incompatibility between these two ports.

TABLE 4

| INPUT PORT TYPES | OUTPUT PORT TYPES |
|---|---|
| any | any.com |
| any | any.com* |
| float64.* | int64.* |
| stream | any |

Figure 1B:
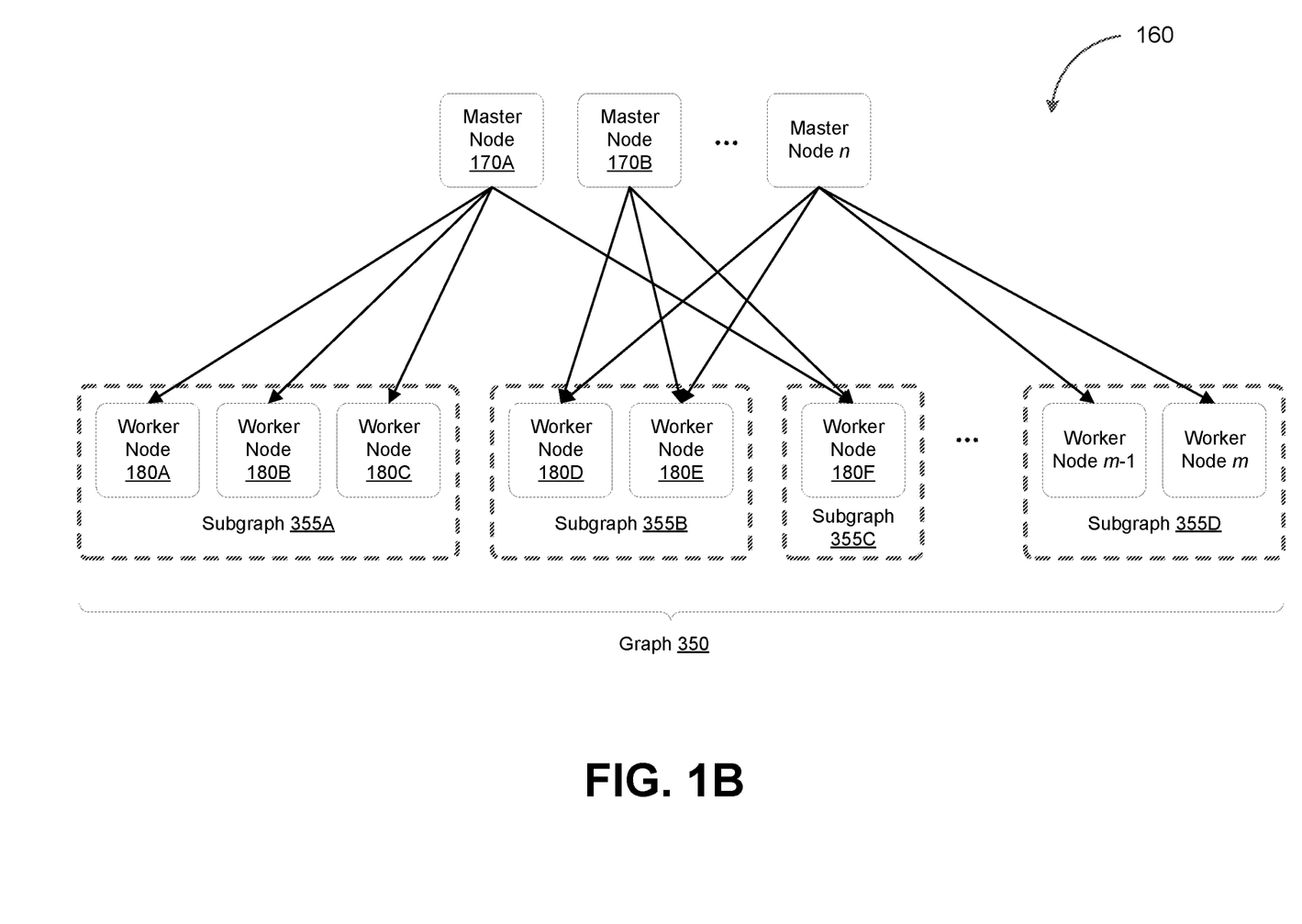
FIG. 1B depicts a distributed cluster, in accordance with some example embodiments.
Figure 3B:
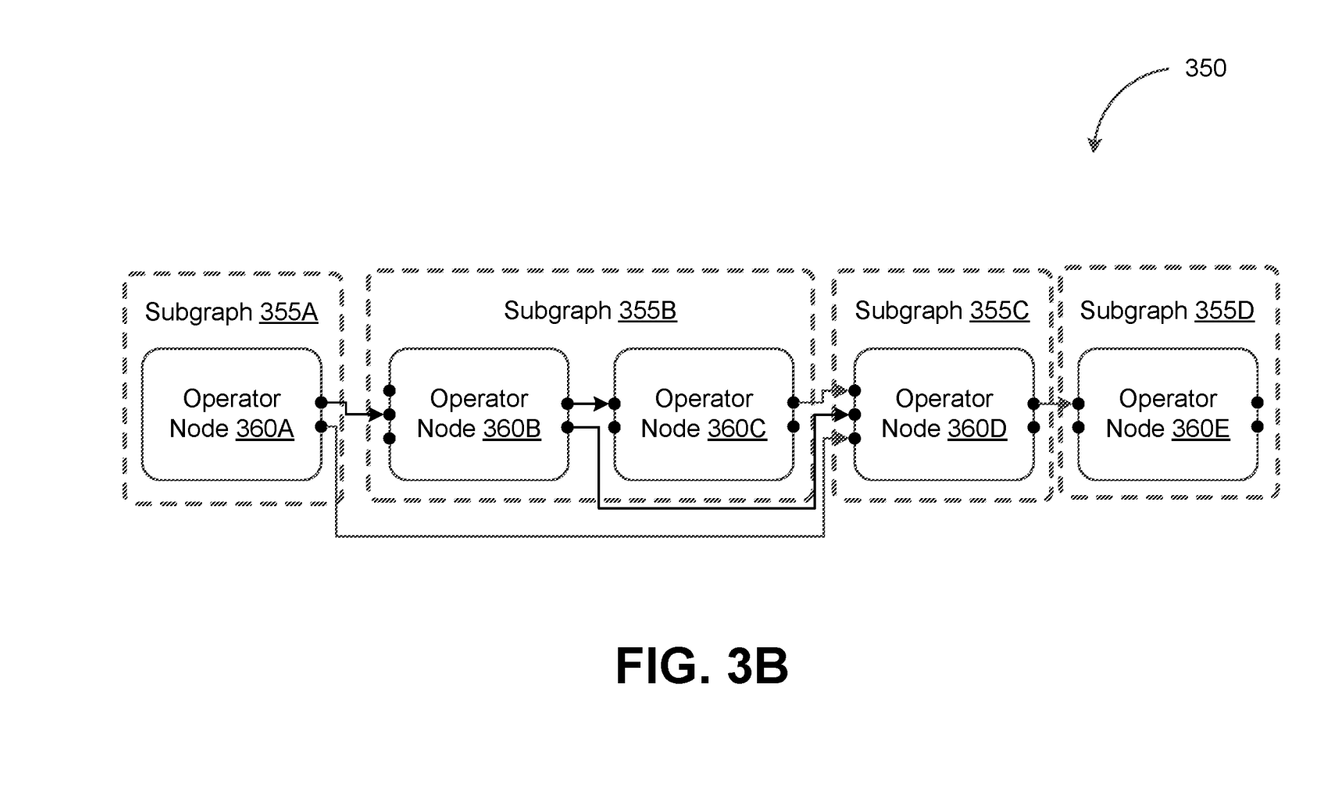
FIG. 3B depicts an example of a graph representative of a data processing pipeline, in accordance with some example embodiments.

FIG. 3B depicts a graph 350 representative of a data processing pipeline, in accordance with some example embodiments. Referring to FIGS. 1B and 3B, the graph 350 may include a plurality of operator nodes including, for example, a first operator node 360A, a second operator node 360B, a third operator node 360C, a fourth operator node 360D, and/or a fifth operator node 360E. Each of the first operator node 360A, the second operator node 360B, the third operator node 360C, the fourth operator node 360D, and/or the fifth operator node 360E may correspond to a data processing operation performed on the data traversing through each individual operation node.

Furthermore, as FIG. 3B shows, the first operator node 360A, the second operator node 360B, the third operator node 360C, the fourth operator node 360D, and/or the fifth operator node 360E may be interconnected via one or more directed edges, each of which indicating a flow of data to and/or from the individual operator nodes. As noted, a first operator node may be interconnected to a second operator node by selecting an output port on the first operator node and dragging a curser from the output port to an input port on the second operator node. For instance, the first operator node 360A may be interconnected to the fourth operator node 360D by selecting an output port on the first operator node 360A and dragging a cursor from the output port on the first operator node 360A to an input port on the fourth operator node 360D. According to some example embodiments, the first operator node 360A may be interconnected with the fourth operator node 360D if the output port on the first operator node 360A and the input port on the fourth operator node 360D are associated with compatible types.

As shown in FIG. 3B, the graph 250 may include a plurality of subgraphs including, for example, a first subgraph 355A, a second subgraph 355B, a third subgraph 335C, and/or a fourth subgraph 355D. Each of the first subgraph 335A, the second subgraph 335B, the third subgraph 335C, and the fourth subgraph 355D may include some but not all of the operator nodes included in the graph 350. It should be appreciated that the graph 350 may be divided into the first subgraph 335A, the second subgraph 335B, the third subgraph 335C, and/or the fourth subgraph 355D as part of executing the corresponding data processing pipeline. For instance, in some example embodiments, the graph 350 may be divided based on a load balance and/or resource availability across different computing nodes in the distributed cluster 160. The division of the graph 350 and the allocation of computing resources within the distributed cluster 160 may be transparent to the client 140. This transparency may reflect a serverless programming paradigm implemented by the pipeline engine 110 in which the client 140 is not required to determine and/or coordinate the allocation of computing resources for executing a data processing pipeline.

Referring again to FIG. 3B, the first subgraph 355A may include the first operator node 360A, the second subgraph 355B may include the second operator node 360B and the third operator node 360C, the third subgraph 355C may include the fourth operator node 360D, and the fourth subgraph 355D may include the fifth operator node 360E. According to some example embodiments, the pipeline engine 110, for example, the scheduler 114, may schedule the data processing operations corresponding to each of the first subgraph 335A, the second subgraph 335B, the third subgraph 335C, and/o the fourth subgraph 355D to be executed by a different computing node from the distributed cluster 160.

To further illustrate, FIG. 1B depicts the distributed cluster 160, in accordance with some example embodiments. Referring to FIGS. 1A-B, the distributed cluster 160 may include a plurality of nodes including, for example, an n quantity of master nodes and an m quantity of worker node. As noted, in some example embodiments, each of the m quantity of worker nodes may be configured to execute one or more data processing operations from one or more data processing pipelines. Meanwhile, each of the n quantity of master nodes may be configured coordinate the execution of the data processing pipelines by the m quantity of worker nodes including by, for example, starting, stopping, and/or configuring the execution of the data processing pipeline.

Referring again to FIG. 1B, the n quantity of master nodes may include a first master node 170A, a second master node 170B, and/or the like. It should be appreciated that the n quantity of master nodes including the first master node 170A and/or the second master node 170B may implement the pipeline engine 110. The m quantity of worker nodes may include a first worker node 180A, a second worker node 180B, a third worker node 180C, a fourth worker node 180D, a fifth worker node 180E, a sixth worker node 180F, a seventh worker node 180G, and/or the like. It should be appreciated that the n quantity of master nodes and/or the m quantity of worker nodes may be physically and/or logically distinct. As such, multiple computing nodes may reside on a single physical cluster and/or different physical clusters within the distributed cluster 160. For example, the first master node 170A and the second master node 170B may reside on a same physical cluster and/or different physical clusters within the distributed cluster 160.

In some example embodiments, the client 140 may control, via one of the n quantity of master nodes, the execution of a data processing pipeline at the distributed cluster 160. For example, the client 140 may start, stop, and/or configure the execution of a data processing pipeline corresponding to a graph 350 via the first master node 170A (or a different master node). Furthermore, trace messages output by one or more of the m quantity of worker nodes during the execution of the data processing pipeline corresponding to the graph 350 may be accessible to the client 140 at one of the n quantity of master nodes. For example, the trace messages output by one or more of the m quantity of worker nodes during the execution of the data processing pipeline corresponding to the graph 350 may be held in a trace log at one of the n quantity of master nodes.

As noted, a trace message may provide information regarding events that occur during the execution of the data processing operations. One or more of the m quantity of worker nodes may, during the execution of one or more data processing operations from the data processing pipeline, publish a trace stream that includes one or more trace messages. According to some example embodiments, the trace messages output by one or more of the m quantity of worker nodes may be pushed to one of the n quantity of master nodes when the master node subscribes to the corresponding trace stream. However, the master node may not become a subscriber to the trace stream published by the worker nodes without the client 140 requesting to receive trace messages from these specific worker nodes. It should be appreciated that the trace messages pushed to the master node may be stored, for example, in a trace log, where the trace messages may be accessible to the client 140.

To further illustrate, refer again to FIG. 1B. The first master node 170A may become a subscriber to a trace stream published by the first worker node 180A, the second worker node 180B, and the third worker node 180C. As shown in FIG. 1B, the first worker node 180A, the second worker node 180B, and the third worker node 180C may execute data processing operations corresponding to a first subgraph 355A of the graph 350. The trace stream published by the first worker node 180A, the second worker node 180B, and the third worker node 180C may include trace messages that provide information regarding events that occur during the execution of the data processing operations corresponding to the first subgraph 355A.

According to some example embodiments, the first master node 170A may become a subscriber to the trace stream published by the first worker node 180A, the second worker node 180B, and the third worker node 180C in response to the client 140 requesting to receive trace messages from the first worker node 180A, the second worker node 180B, and the third worker node 180C. In doing so, trace messages output by the first worker node 180A, the second worker node 180B, and the third worker node 180CT may be pushed to the first master node 170A. The trace messages pushed to the first master node 170A may be stored at the first master node 170A, for example, in a trace log. Furthermore, the client 140 may access, via the first master node 170A, the trace messages output by the first worker node 180A, the second worker node 180B, and/or the third worker node 180C. For instance, at least some of the trace messages output by the first worker node 180A, the second worker node 180B, and/or the third worker node 180C may be displayed, at the client 140, in the user interface 150.

Alternatively and/or additionally, the first master node 170A may become a subscriber to a trace stream published by the sixth worker node 180F, which may include trace messages that provide information regarding events that occur during the execution of the data processing operations corresponding to a third subgraph 355C of the graph 350. The first master node 170A may become a subscriber to the trace stream published by the sixth worker node 180F in response to the client 140 requesting to receive trace messages from the sixth worker node 180F. By becoming a subscriber to the trace stream published by the sixth worker node 180F, trace messages output by the sixth worker node 180F may be pushed to the first master node 170A. Furthermore, these trace messages may be stored at the first master node 170A, for example, in a same trace log and/or a different trace log as the trace messages output by the first worker node 180A, the second worker node 180B, and/or the third worker node 180C. The client 140 may access, via the first master node 170A, the trace messages output by the sixth worker node 180F. For example, at least some of the trace messages output by the sixth worker node 180F may be displayed, at the client 140, in the user interface 150.

Referring again to FIGS. 1A-B, the messaging controller 165 coupled with the distributed cluster 160 may be configured to coordinate the routing of trace messages between the n quantity of master nodes and the m quantity of worker nodes. According to some example embodiments, the messsage controller 165 may route the trace messages in accordance to a published-subscriber model. As such, trace messages from a worker node may only be pushed to a master node subscribing to a trace stream published by that worker node. Moreover, as noted, the master node may not become a subscriber to the trace stream published by the worker node without the client 140 requesting to receive trace messages output by that worker node. When the master node subscribes to the trace stream published by the worker node, the messaging controller 165 may assign, to the worker node, a listener configured to detect when the worker node outputs a trace message.

For example, as shown in FIG. 1B, the messaging controller 165 may cordite the routing of trace messages between the first master node 170A and the first worker node 180A, the second worker node 180B, and the third worker node 180C. As noted, the first worker node 180A, the second worker node 180B, and the third worker node 180C may generate one or more trace messages during the execution of data processing operations corresponding to the first subgraph 355A of the graph 350. Moreover, the first master node 170A may become a subscriber to a trace stream published by the first worker node 180A, the second worker node 180B, and the third worker node 180C as a response to the client 140 requesting to receive trace messages from the first worker node 180A, the second worker node 180B, and the third worker node 180C.

Upon the first master node 170A becoming a subscriber to the trace stream published by the first worker node 180A, the second worker node 180B, and the third worker node 180C, the messaging controller 165 may assign a listener to the first worker node 180A, the second worker node 180B, and the third worker node 180C. The listener may be configured to detect when, during the execution of the data processing operations corresponding to the first subgraph 355A, the first worker node 180A, the second worker node 180B, and/or the third worker node 180C outputs a trace message. The messaging controller 165 may push the trace message to the first master node 170A, where the trace message may be stored in a trace log. In some example embodiments, the client 140 may access, via the first master node 170A, the trace message output by the first worker node 180A, the second worker node 180B, and/or the third worker node 180C. For instance, the client 140 may query the first master node 170A in order to retrieve the trace messages stored at the first master node 170A, for example, in the trace log. Alternatively and/or additionally, the first master node 170A may send, to the client 140, the trace messages output by the first worker node 180A, the second worker node 180B, and/or the third worker node 180C. These trace messages may be displayed at the client 140, for example, by the user interface 150.

Alternatively and/or additionally, the messaging server 165 may also assign a listener to the sixth worker node 180F when the first master node 170A becomes a subscriber to the trace stream published by the sixth worker node 180F. The listener may be configured to detect when, during the execution of the data processing operations corresponding to the third subgraph 355C, the sixth worker node 180F outputs a trace message. In some example embodiments, the messaging controller 165 may push, to the first master node 170A, the trace message output by the sixth worker node 180F. The trace message may be stored at the first master node 170A, for example, in a trace log, where the trace message may be accessible to the client 140.

In some example embodiments, the client 140 may configure, for example, via the user interface 150, which trace messages may be pushed to the first master node 170A. Meanwhile, the messaging server 165 may be configured to filter a trace stream published by a worker node in accordance with these configurations. For instance, the client 140 may specify one or more criteria including, for example, a type of trace messages, a threshold severity level of trace messages, and/or the like. The messaging server 165 may filter, based on the one or more criteria, the trace stream published by the worker node. For example, the messaging server 165 may avoid pushing, to a master node subscribing to the trace stream, any trace messages that do not meet the one or more criteria specified by the client 140. Filtering trace streams, for example, based on criteria specified by the client 140 may further reduce network traffic by avoiding the unnecessary of transfer of unwanted trace messages.

Table 5 below depicts examples of severity levels associated with various trace messages including, for example, INFO, FATAL, ERROR, DEBUG, WARNING, and/or the like. The client 140 may specify that only trace messages exceeding the ERROR severity level may be pushed to the first master node 170A from the first worker node 180A, the second worker node 180B, and/or the third worker node 180C. Accordingly, the messaging server 165 may be filter, from the trace stream published by the first worker node 180A, the second worker node 180B, and/or the third worker node 180C, any trace message that do not rise to the ERROR severity level. For instance, the messaging server 165 may avoid pushing, to the first master node 170A, trace messages associated with an INFO and a DEBUG severity level.

TABLE 5

| TRACE SEVERITY THRESHOLD | DESCRIPTION |
| --- | --- |
| INFO | The publisher streams trace messages that contain information text, mostly for echoing what has been performed in the tool. The trace messages streamed will also include trace messages associated with warnings, errors and fatal errors. |
| FATAL | The publisher streams trace messages associated with fatal errors that may occur when working with the tool. |
| ERROR | The publisher streams trace messages that contain information describing the error conditions that may occur when working with the tool. The trace messages streamed will also include messages associates with the fatal error threshold level. |
| DEBUG | The publisher streams trace messages that contain useful information for developers mostly to debug and analyze the tool. The trace messages streamed will also include messages associated with info, error, warning and fatal error threshold levels. |
| WARNING | The publisher streams messages associated to warnings and errors that may occur when working with the tool. The trace messages streamed will also include messages associated with error and fatal error threshold levels. |

Figure 4:
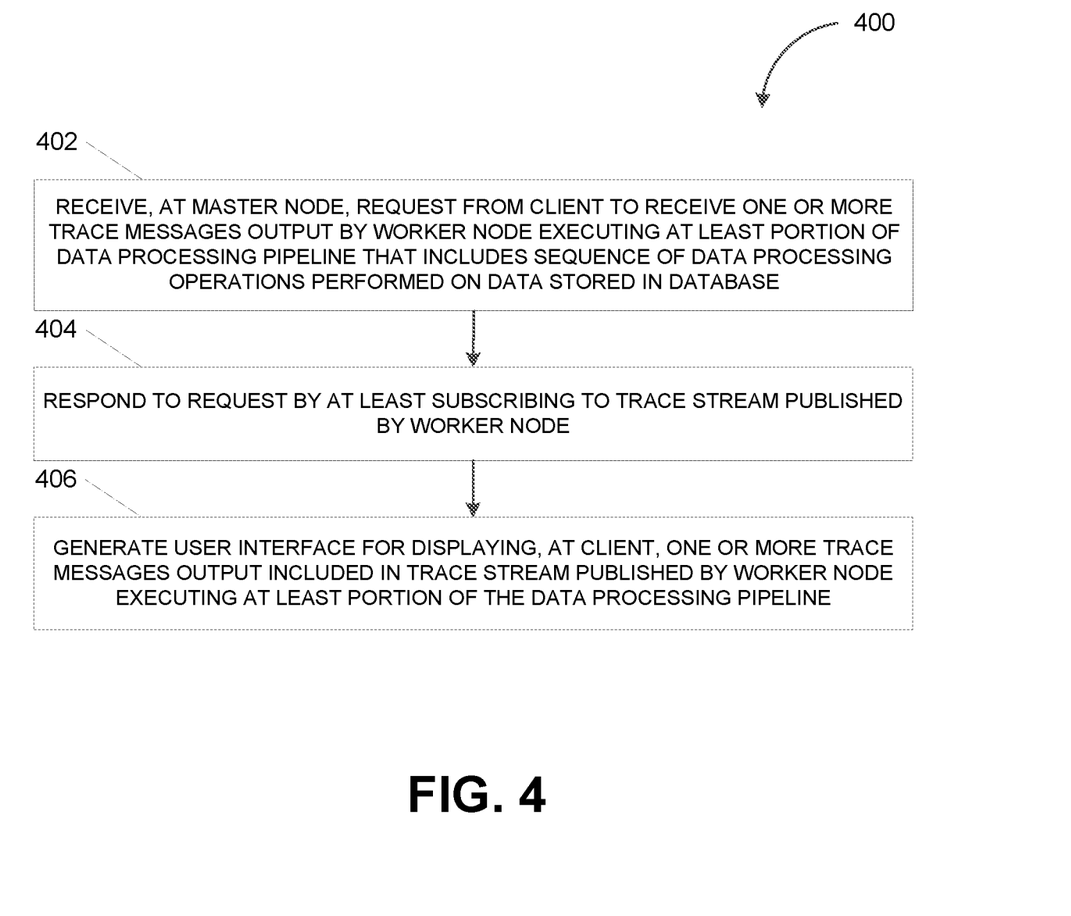
FIG. 4 depicts a flowchart illustrating a process for routing trace messages, in accordance with some example embodiments.

FIG. 4 depicts a flowchart illustrating a process 400 for routing trace messages in accordance with some example embodiments. Referring to FIGS. 1A-B, 2, 3A-B, and 4, the process 400 may be performed by one of the n quantity of master nodes in the distributed cluster 160 including, for example, the first master node 170A or a different master node. The process 400 may be performed in order to route trace messages output by one or more of the m quantity of worker nodes in the distributed cluster 160 while executing a data processing pipeline that includes a sequence of data processing operations.

At 402, the first master node 170A may receive, from the client 140, a request to receive one or more trace messages output by a worker node executing at least a portion of a data processing pipeline that includes a sequence data processing operations performed on data stored in a database. In some example embodiments, a data processing pipeline, which may include a sequence of data processing operations performed on data stored in the database 120, may be executed by the distributed cluster 160. The data processing pipeline may correspond to the graph 350 which, as shown in FIGS. 1B and 3B, may include multiple subgraphs including, for example, the first subgraph 355A, the second subgraph 355B, the third subgraph 355C, and/or the fourth subgraph 355D. Each subgraph may include one or more data processing operations, which may be performed by one or more of the m quantity of worker nodes in the distributed cluster 160. Meanwhile, one of the n quantity of master nodes in the distributed cluster 160 may coordinate the execution of the data processing pipeline by various worker nodes including, for example, the execution of the data processing operations corresponding to the first subgraph 355A, the second subgraph 355B, the third subgraph 355C, and the fourth subgraph 355D.

For instance, FIG. 1B shows the data processing operations corresponding to the first subgraph 355A as being executed by the first worker node 180A, the second worker node 180B, and the third worker node 180C. Alternatively and/or additionally, data processing operations corresponding to the third subgraph 355C may be executed by the sixth worker node 180F. The first master node 170A may coordinate the execution of the first subgraph 355A by the first worker node 180A, the second worker node 180B, and the third worker node 180C.

According to some example embodiments, the first worker node 180A, the second worker node 180B, and/or the third worker node 180C may output trace messages during the execution of the data processing operations corresponding to the first subgraph 355A. The sixth worker node 180F may also output trace messages while executing the third subgraph 355C. These trace messages may provide information regarding events that occur during the execution of the data processing operations corresponding to the first subgraph 355A and/or the third subgraph 355C. In order to gain access to trace messages output by the first worker node 180A, the second worker node 180B, and the third worker node 180C, the client 140 may send, to the first master node 170A, a request to receive trace messages output by the first worker node 180A, the second worker node 180B, and the third worker node 180C. Alternatively and/or additionally, the client 140 may also send, to the first master node 170A, a request to receive trace message output by the sixth worker node 180F.

At 404, the first master node 170A may respond to the request by at least subscribing to a trace stream published by the worker node. In some example embodiments, the first master node 170A may respond to the request from the client 140 by becoming a subscriber to the trace stream published by the first worker node 180A, the second worker node 180B, and the third worker node 180C. The first master node 170A may further respond to the request from the client 140 by becoming a subscriber to the trace stream published by the sixth worker node 180F. However, as noted, the first master node 170A may not become a subscriber to a trace stream without the client 140 requesting to receive trace messages output by the one or more worker nodes publishing the trace stream. For example, the first master node 170A may become a subscriber to the trace stream published by the first worker node 180A, the second worker node 180B, and the third worker node 180C but not the trace stream published by the sixth worker node 180F if the client 140 requested to receive trace messages from the first worker node 180A, the second worker node 180B, and the third worker node 180C but not trace messages from the sixth worker node 180F.

Referring again to FIG. 1A, the messaging controller 165 can be configured to route messages between the n quantity of master nodes and the m quantity of worker nodes in the distributed cluster 160. For example, when the first master node 170A subscribes to the trace stream published by the first worker node 180A, the second worker node 180B, and the third worker node 180C, the messaging controller 165 may deploy a listener configured to detect when the first worker node 180A, the second worker node 180B, and/or the third worker node 180C output a trace message. The messaging controller 165 may further push, to the first master node 170A, trace messages output by the first worker node 180A, the second worker node 180B, and/or the third worker node 180C. Alternatively and/or additionally, the messaging controller 165 may deploy a listener configured to detect when the sixth worker node 180F outputs a trace message in response to the first master node 170A subscribing to the trace stream published by the sixth worker node 180F. Trace messages output by the sixth worker node 180F may be pushed to the first master node 170A.

At 406, the first master node 170A generate a user interface for displaying, at the client 140, one or more trace messages included in the trace stream published by the worker node executing at least the portion of the data processing pipeline. In some example embodiments, the client 140 may access trace messages via the first master node 170A. For example, trace messages pushed to the first master node 170A, for example, from the first worker node 180A, the second worker node 180B, the third worker node 180C, and/or the sixth worker node 180F, may be stored in a trace log. The client 140 may access these trace messages by at least querying the first master node 170A. Alternatively and/or additionally, the first master node 170A may generate the user interface 150 for displaying, at the client 140, at least some of the trace messages pushed to the first master node 170A, for example, from the first worker node 180A, the second worker node 180B, the third worker node 180C, and/or the sixth worker node 180F. For instance, as shown in FIG. 2, trace messages may be viewed under the trace tab 245C of the user interface 150.

Figure 5:
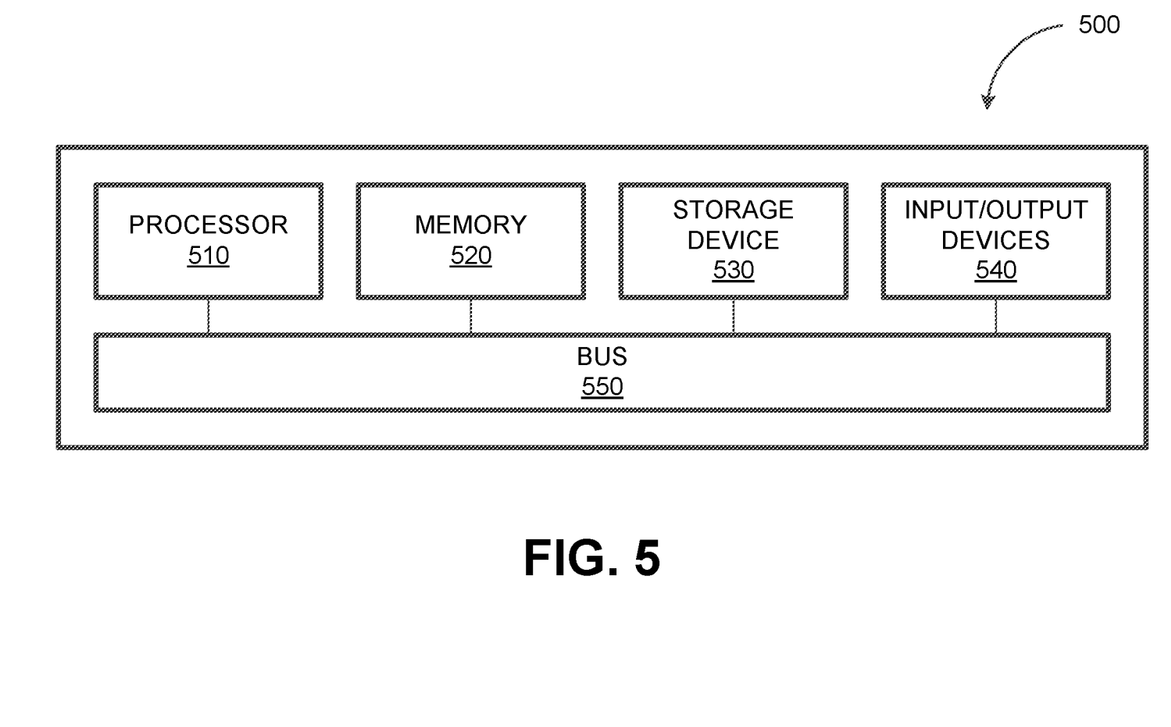
FIG. 5 depicts a block diagram illustrating a computing system, in accordance with some example embodiments.

FIG. 5 depicts a block diagram illustrating a computing system 500, in accordance with some example embodiments. Referring to FIGS. 1 and 5, the computing system 500 can be used to implement the pipeline engine 110, the distributed cluster 160, and/or any components therein.

As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, the pipeline engine 110, the distributed cluster 160, and/or the like. In some example embodiments, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a solid state drive, a floppy disk device, a hard disk device, an optical disk device, or a tape device, or other suitable persistent storage means. The input/output device 540 provides input/output operations for the computing system 500. In some example embodiments, the input/output device 540 includes a keyboard and/or pointing device. In various implementations, the input/output device 540 includes a display unit for displaying graphical user interfaces.

According to some example embodiments, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some example embodiments, the computing system 500 can be used to execute various interactive computer software applications that can be used for organization, analysis and/or storage of data in various formats. Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning as an add-in for a spreadsheet and/or other type of program) or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random query memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
    at least one data processor; and
    at least one memory storing instructions which, when executed by the at least one data processor, result in operations comprising:
        receiving, at a first master node, a request from a client to receive a first stream including one or more trace messages output by a first worker node executing at least a portion of a data processing pipeline, the data processing pipeline including a sequence of data processing operations, the first master node and the first worker node comprising a distributed cluster of computing nodes that further includes a second worker node, and the one or more trace messages included in the first trace stream corresponding to one or more events occurring during the execution of at least the portion of the data processing pipeline;
        in response to the request from the client, subscribing, by the first master node, to the first trace stream published by the first worker node, the first master node subscribing, based at least on the client requesting to receive the first trace stream published by the first worker node but not a second trace stream published by the second worker node, to the first trace stream published by the first worker node but not the second trace stream published by the second worker node;
in response to a failure at the first master node, subscribing, by a second master node, to the first trace stream published by the first worker node; and
generating, by the first master node or the second master node, a user interface for displaying, at the client, the one or more trace messages included in the first trace stream published by the first worker node.

2. The system of claim 1, wherein the first worker node executes a first portion of the data processing pipeline and the second worker node executes a second portion of the data processing pipeline, and wherein the first master node coordinates the execution of the data processing pipeline by the first worker node and the second worker node.

3. The system of claim 2, further comprising:
receiving, from the client, another request to receive a second trace stream including one or more trace messages output by the second worker node during the execution of the second portion of the data processing pipeline; and
responding to the other request by at least subscribing to the second trace stream published by the second worker node.

4. The system of claim 3, further comprising:
storing, in a trace log, at least one the one or more trace messages included in the first trace stream published by the first worker node and the one or more trace messages included in the second trace stream published by the second worker node.

5. The system of claim 2, wherein the first portion of the data processing pipeline and the second portion of the data processing pipeline each include one or more data processing operations from the sequence of data processing operations, and wherein the one or more data processing operations are performed on data stored in a database.

6. The system of claim 1, wherein a listener is deployed at the first worker node in response to the first master node subscribing to the first trace stream published by the first worker node, wherein the listener is configured to detect when the first worker node outputs a trace message, and wherein at least some trace messages output by the first worker node are pushed to the first master node.

7. The system of claim 6, wherein the one or more trace messages output by the first worker node are filtered prior to being pushed to the first master node, and wherein the one or more trace messages are filtered based at least on a threshold severity level specified by the client.

8. The system of claim 1, wherein the data processing pipeline is associated with a graph representative of the data processing pipeline, wherein the graph includes a plurality of nodes corresponding to the sequence of data processing operations, wherein the graph further includes one or more edges indicating a flow of data between consecutive data processing operations, and wherein at least the portion of the data processing pipeline is executed based at least on the graph.

9. A computer-implemented method, comprising:
receiving, at a first master node, a request from a client to receive a first stream including one or more trace messages output by a first worker node executing at least a portion of a data processing pipeline, the data processing pipeline including a sequence of data processing operations, the first master node and the first worker node comprising a distributed cluster of computing nodes that further includes a second worker node, and the one or more trace messages included in the first trace stream corresponding to one or more events occurring during the execution of at least the portion of the data processing pipeline;
in response to the request from the client, subscribing, by the first master node, to the first trace stream published by the first worker node, the first master node subscribing, based at least on the client requesting to receive the first trace stream published by the first worker node but not a second trace stream published by the second worker node, to the first trace stream published by the first worker node but not the second trace stream published by the second worker node;
in response to a failure at the first master node, subscribing, by a second master node, to the first trace stream published by the first worker node; and
generating, by the first master node or the second master node, a user interface for displaying, at the client, the one or more trace messages included in the first trace stream published by the first worker node.

10. The method of claim 9, wherein the first worker node executes a first portion of the data processing pipeline and the second worker node executes a second portion of the data processing pipeline, and wherein the first master node coordinates the execution of the data processing pipeline by the first worker node and the second worker node.

11. The method of claim 10, further comprising:
receiving, from the client, another request to receive a second trace stream including one or more trace messages output by the second worker node during the execution of the second portion of the data processing pipeline; and
responding to the other request by at least subscribing to the second trace stream published by the second worker node.

12. The method of claim 11, further comprising:
storing, in a trace log, at least one of the one or more trace messages included in the first trace stream published by the first worker node and the one or more trace messages included in the second trace stream published by the second worker node.

13. The method of claim 10, wherein the first portion of the data processing pipeline and the second portion of the data processing pipeline each include one or more data processing operations from the sequence of data processing operations, and wherein the one or more data processing operations are performed on data stored in a database.

14. The method of claim 9, wherein a listener is deployed at the first worker node in response to the first master node subscribing to the first trace stream published by the first worker node, wherein the listener is configured to detect when the first worker node outputs a trace message, and wherein at least some trace messages output by the first worker node are pushed to the first master node.

15. The method of claim 14, wherein the one or more trace messages output by the first worker node are filtered prior to being pushed to the first master node, and wherein the one or more trace messages are filtered based at least on a threshold severity level specified by the client.

16. A non-transitory computer-readable medium storing instructions, which when executed by at least one data processor, result in operations comprising:

receiving, at a first master node, a request from a client to receive a first stream including one or more trace messages output by a first worker node executing at least a portion of a data processing pipeline, the data processing pipeline including a sequence of data processing operations, the first master node and the first worker node comprising a distributed cluster of computing nodes that further includes a second worker node, and the one or more trace messages included in the first trace stream corresponding to one or more events occurring during the execution of at least the portion of the data processing pipeline;

in response to the request from the client, subscribing, by the first master node, to the first trace stream published by the first worker node, the first master node subscribing, based at least on the client requesting to receive the first trace stream published by the first worker node but not a second trace stream published by the second worker node, to the first trace stream published by the first worker node but not the second trace stream published by the second worker node;

in response to a failure at the first master node, subscribing, by a second master node, to the first trace stream published by the first worker node; and generating, by the first master node or the second master node, a user interface for displaying, at the client, the one or more trace messages included in the first trace stream published by the first worker node.

* * * * *